US00RE38317E

(19) United States
(12) Reissued Patent
Vikiö

(10) Patent Number: US RE38,317 E
(45) Date of Reissued Patent: Nov. 18, 2003

(54) METHOD AND APPARATUS FOR TREATING FILLER-CONTAINING MATERIAL, SUCH AS RECYCLED FIBERS

(75) Inventor: Pentti Vikiö, Karhula (FI)

(73) Assignee: Andritz Oy, Helsinki (FI)

(21) Appl. No.: 09/589,545

(22) PCT Filed: Mar. 10, 1994

(86) PCT No.: PCT/FI94/00086

§ 371 (c)(1),
(2), (4) Date: Jan. 24, 1996

(87) PCT Pub. No.: WO95/04189

PCT Pub. Date: Feb. 9, 1995

Related U.S. Patent Documents

Reissue of:
(64) Patent No.: 5,776,304
Issued: Jul. 7, 1998
Appl. No.: 08/586,870
Filed: Jan. 24, 1996

(30) Foreign Application Priority Data

Jul. 28, 1993 (FI) ..... 933369

(51) Int. Cl.[7] ..... D21C 5/02
(52) U.S. Cl. ..... 162/4; 162/55; 209/3; 209/17; 209/728; 209/729
(58) Field of Search ..... 162/4, 55, 189, 162/190, 264, DIG. 7, DIG. 9; 209/3, 17, 728, 729; 241/24, 28

(56) References Cited

U.S. PATENT DOCUMENTS

| | | | | |
|---|---|---|---|---|
| 1,821,849 A | | 9/1931 | Rafton | 91/68 |
| 1,934,638 A | | 11/1933 | Rafton | 91/68 |
| 4,167,438 A | * | 9/1979 | Holz | 162/4 |
| 4,200,486 A | | 4/1980 | Vagac | 162/8 |
| 4,504,016 A | | 3/1985 | Wikdahl | 241/24 |
| 4,606,789 A | | 8/1986 | Reinhall | 162/23 |
| 4,999,084 A | | 3/1991 | Lang et al. | 162/4 |

FOREIGN PATENT DOCUMENTS

| | | |
|---|---|---|
| CA | 2094809 | 4/1992 |
| DE | 29 37 279 C1 | 4/1991 |
| EP | 0 354 307 A1 | 5/1989 |
| WO | WO 92/08001 | 4/1992 |

OTHER PUBLICATIONS

Burchardt et al, "Stückeaufbereitung in einer Feinpapierfabric", Wochenblatt Für Paperfabrikation, 23/24, 1994, pp. 936–942. [Abstract Translation].
Weigel et al, "Entwiklung eines Dispergier– und Aktivier–Verfahrens für Druckpapierfüllstoffe", Wochenblatt Für Paperfabrikation, 14, 1989, pp. 627–636. [Abstract Translation].
Dr. Martin Sändig oHG, Handbuch Der Papier– Und Pappenfabrikation, 1971, pp. 565–567 and 1815. [Translation].

* cited by examiner

*Primary Examiner*—Dean T. Nguyen
(74) *Attorney, Agent, or Firm*—Nixon & Vanderhye P.C.

(57) ABSTRACT

Recycled fiber pulp from a vortex cleaning plant (e.g. connected to the short circulation of a paper machine) effects the recovery and return of fillers in the recycled fiber pulp discharged from the vortex cleaning plant, in an efficient and economical manner. The loss of filler in the recycled fiber pulp discharged from the vortex cleaning plant is decreased by treating a concentrated fraction of the rejects from the vortex cleaning plant with a mixer/disperser for dispersing the filler in the recycled fiber pulp, and returning as much usable filler as possible back to the process.

36 Claims, 8 Drawing Sheets

METHOD AND APPARATUS FOR TREATING FILLER-CONTAINING MATERIAL, SUCH AS RECYCLED FIBERS

Matter enclosed in heavy brackets [ ] appears in the original patent but forms no part of this reissue specification; matter printed in italics indicates the additions made by reissue.

CROSS-REFERENCE TO RELATED APPLICATION

This application is the U.S. National Phase of International Application No. PCT/FI94/00086 filed Mar. 10, 1994.

BACKGROUND AND SUMMARY OF THE INVENTION

The present invention relates to a method and apparatus for treating recycled fibers and/or fraction exiting from the vortex cleaning as mill reject. As is known, sources of recycled fibers include both the so called broke of a paper machine, which may be rerecycled as raw material, and the actual post-consumer waste paper and board. The present invention especially relates to the treatment of such recycled fiber materials so that the fillers therein may be recovered as well as possible and returned back to the process as efficiently and economically as possible.

In the short circulation of paper machines manufacturing filler-containing paper grades and especially coated paper grades a lot of mineral and pigment fraction is discharged nowadays from the process as mill reject of a vortex cleaning plant, which of its content might be utilized as raw material for paper, but is of its particle size too coarse.

In the short circulation of paper machines manufacturing SC grades and grades containing other fillers, the mineral fraction exiting the vortex cleaning as mill reject is the coarse portion of the mineral fraction added in the pulp dosing, the particle size being generally more than 10 μm.

In the short circulation of paper machines manufacturing coated paper grades the mineral fraction exiting the process as mill reject mainly contains non-dispersable coating layer of coated waste paper. The coating pigment has not dispersed in the dispersion system to particles fine enough. The fraction of the coating pigment, which has not been dispersed and is of its size generally more than 10 μm, is rejected in the vortex cleaning of the short circulation.

The same applies to systems for recycled pulp, in which coated newspaper or like heavily coated raw material for recycled paper is used as raw material. In the defiberizing system for recycled pulp the coating pigment of the coated paper is released from the actual fiber layer of the paper more or less in sheet-like fractions, which are partially dispersed due to the process. The dispersion is, however, not complete and that is why these coating pigment particles which have remained non-dispersed are discharged from the screening stage of the process as reject of the vortex cleaning. However, the majority of the particles would be of their raw material content filler material usable in the paper manufacture, which may possibly be added to the fiber suspension in the later stages of the paper manufacture. The size of these particles is such that said particles cause problems in the paper manufacture if they are not dispersed and thus made qualified to be used as fillers.

U.S. Pat. No. 4,504,016 discloses a process and apparatus for cleaning chemical cellulose by screening. The problem underlying the patent is to increase the yield of chemical pulp in the production thereof. In the process the cellulose is sorted and a coarse fraction, i.e. knots and shives, is treated in a refiber and further sorted. Since it is a question of a chemical pulp manufacture process there are no further substances e.g. filler material involved in the process. Also, the document teaches the removal of the rejects of the hydrocyclone out of the system.

U.S. Pat. No. 4,167,438 discloses a process and apparatus for preparing and cleaning fibrous material, e.g. mixed waste paper. The publication teaches the combined recycle of both fibers and fillers back to use. There is no suggestion that the process could be used for separating and treating the mere filler fraction of the waste paper pulp.

In an arrangement in accordance with the present invention the loss in fillers/minerals exiting the vortex cleaning as mill reject is diminished by treating fraction having a concentrated mineral content in the vortex cleaning plant for dispersing mineral fractions and returning them back to the process.

Advantages obtained by utilizing the method and apparatus in accordance with the present invention are, for example, following:

- Filler/mineral, water, chemical, heat and fiber losses are as low as possible. Only useless fraction and fraction that cannot be changed into a form that can be re-used are discharged in a very concentrated form.
- Dispersion of mineral particles is based on internal shear forces of the suspension, in other words mechanical wear is minimal.
- Investment costs of the system are very low. Technical realization is carried out with commercial apparatuses, repayment period is short.
- System is easy to build, i.e. it may be mounted to the already existing systems by adding a screening apparatus fractionating the mineral fraction and wood fraction separate and a new kind of cleaner for the discharge of reject in a very concentrated form after the last cleaner step and by adding a treatment stage dispersing the mineral fractions thereafter.
- Treatment is carried out, for example, in the short circulation of a paper machine for each machine individually, whereby, for example, the water circulations between the machines are not mixed.
- System is a continuously operating part of a short circulation of a paper machine, or of a screening system. In other words, the process conditions are constant and the operation trouble-free. Process adjusts itself, for example, if the amount of the coarse fraction increases, the system returns only the dispersed fraction to the process and the rest is discharged from the system.

BRIEF DESCRIPTION OF THE DRAWINGS

The characteristics of the method and apparatus in accordance with the present invention become apparent in the enclosed patent claims.

The method and apparatus in accordance with the present invention are described more in detail below, by way of example, with reference to the accompanying drawings, in which FIGS. 1a and 1b schematically illustrate two filler treatment systems in accordance with prior art.

DETAILED DESCRIPTION OF THE DRAWINGS

Figure 1A:
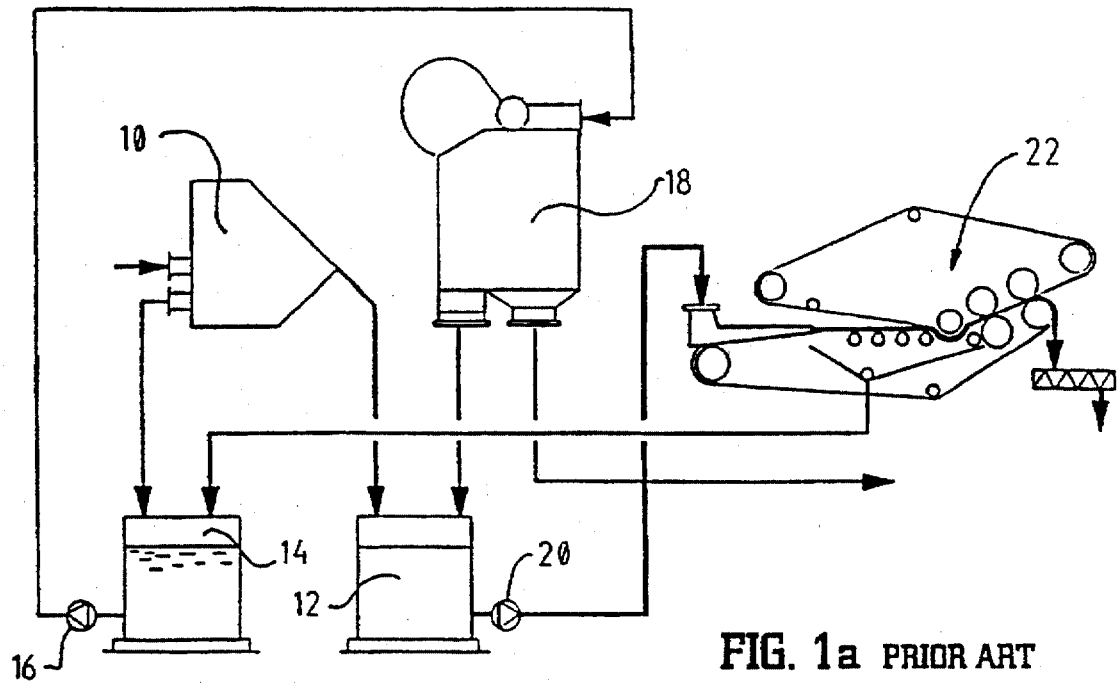
FIG. 1a PRIOR ART

An example of the prior art arrangements for diminishing filler/mineral losses is, for example, an arrangement in accordance with FIG. 1a. There the mineral loss is diminished by fractionating all fine material, i.e. solid material of useful size, from the flow exiting the process back to the process. Said apparatus operates in such a way that the flow exiting from the process is brought to a curved screen 10, a so called Hydra-screen, which divides the flow into two fractions. The coarser fraction is led to an intermediate tank 12 and the finer fraction to a filtrate tank 14. The finer fraction is pumped from the filtrate tank 14 by a pump 16 to a curved screen 18, a so called Micra-screen, of the secondary stage, the coarser fraction of which is led to the intermediary tank 12 and the finer fraction, practically speaking clear liquid and the fine filler therewith to be reused, for example, for the dilutions necessary in the process. The fraction discharged from the intermediary tank 12 as reject of curved screens 10 and 18 is pumped by a pump 20, for example, to a filter press 22 for thickening the coarse fraction to a more useful consistency. In addition to a curved screen 10, as in FIG. 1a, also a finely perforated/slotted pressure screen or vortex cleaners (FIG. 1b), such as so called trap cleaners commonly used in sand separation may be used as a fractionation apparatus.

Figure 1B:
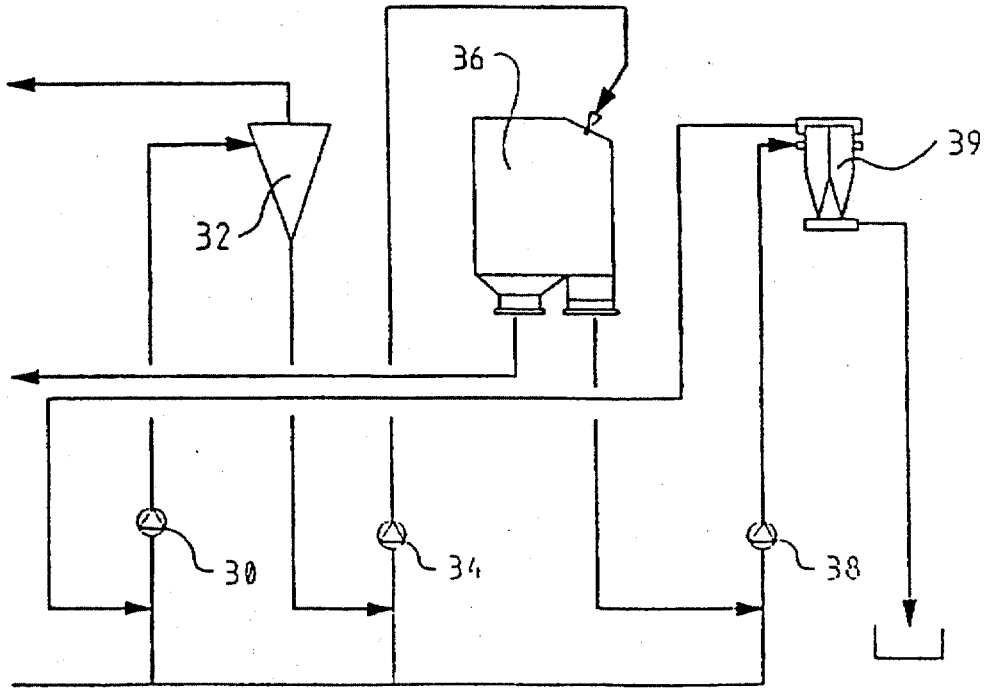
FIG. 1b PRIOR ART

According to FIG. 1b the material to be treated is obtained as a reject from the third or fourth step of a vortex cleaning plant 32, where the fine fraction rejected by the vortex cleaning plant 32 is led back to use. The material rejected from the vortex cleaning plant is led by a pump 34 to a curved screen 36, preferably a so called Micra-screen, and the liquid accepted by said curved screen 36, the so called filtrate, is led to the wire pit or, for example, to the dilution in a secondary screening apparatus. The reject of the curved screen 36, in other words the thicker fraction, again, is led to the suction side of a pump 38, from where it is further pumped to a cleaner 39, preferably a so called Eliminator-cleaner, which is disclosed, for example, in U.S. Pat. No. 5,139,652. The accept from the cleaner 39 is led to the suction side of a feed pump 30 of the third or fourth step 32 of the vortex cleaning plant to be pumped again to the recirculation.

It is, however, characteristic of all said methods that they do not change/diminish the particle size/distri-bution of the solids to be treated, but only separate the fine and as such usable fraction and the coarse fraction and return the fine fraction to use.

It is a characteristic feature of a dispersion process of mineral fractions that it is based on internal shear forces of the flow/suspension which are mechanically generated. In order for the shear forces to have a dispersing effect in the suspension, in other words the shear forces to be effective enough, the concentration of the suspension must be high. Principally, the higher the concentration is, in which the treatment takes place, the more efficient it is, in other words the greater the shear forces are, which may be directed to the suspension and the more efficiently the dispersion takes place.

The concentration of the mineral fraction is sufficiently increased by means of a new kind of vortex cleaner construction disclosed in U.S. Pat. No. 5,139,652, said cleaner being extremely efficient in classifying, but from which the coarse mineral fraction, having the size of more than 10 μm, is rejected as a very concentrated flow having a solids content of even more than 40%.

The concentration of the fractions to be treated may be increased also, for example, by filtering or precipitating, but it is characteristic of all these other methods that they require additional apparatuses and/or great volumes and are rather complicated to be carried out as a continuous, trouble-free process. The concentration of the mineral fraction in a new kind of vortex cleaner takes place in connection with the normal operation of the vortex cleaner without any additional apparatuses.

After the thickening, i.e. the increase of the solids concentration, the mineral fraction is treated by mechanical mixing elements or grinding apparatuses generating great internal shear forces in the suspension. Due to the shear forces the mineral particles rub against each other and are comminuted to such a particle size, that they may be used as a filler in paper manufacture.

Figure 2:
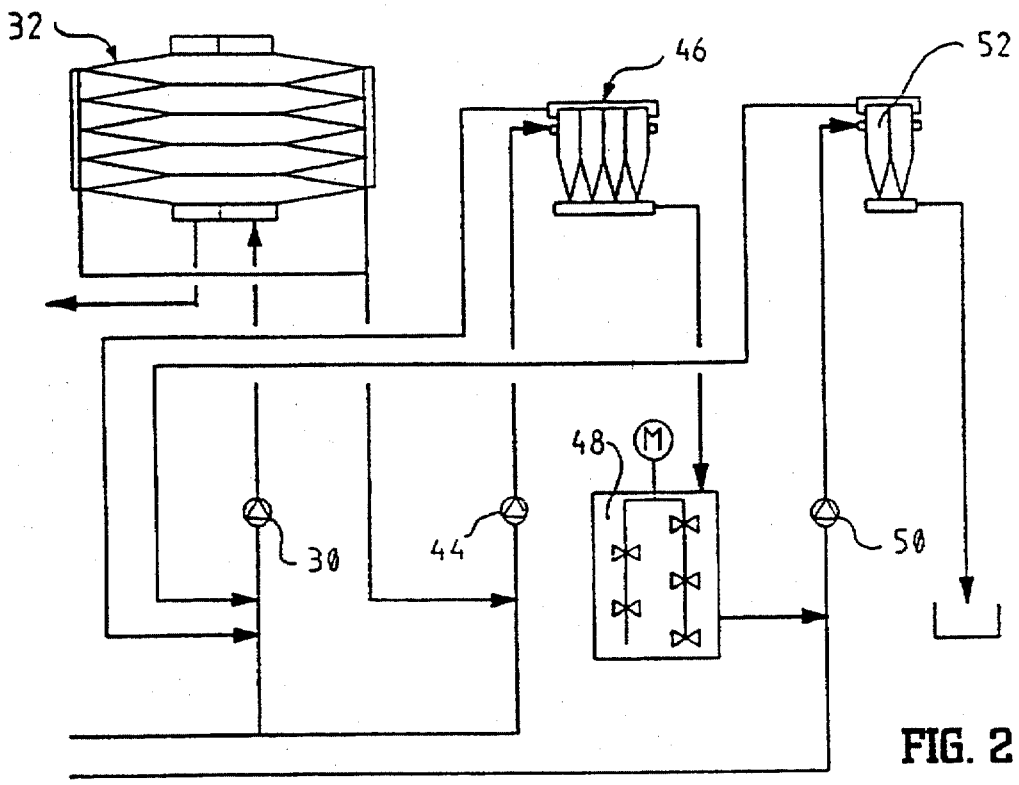
FIG. 2 schematically illustrates a filler treatment system in accordance with a preferred embodiment of the present invention.
Figure 3:
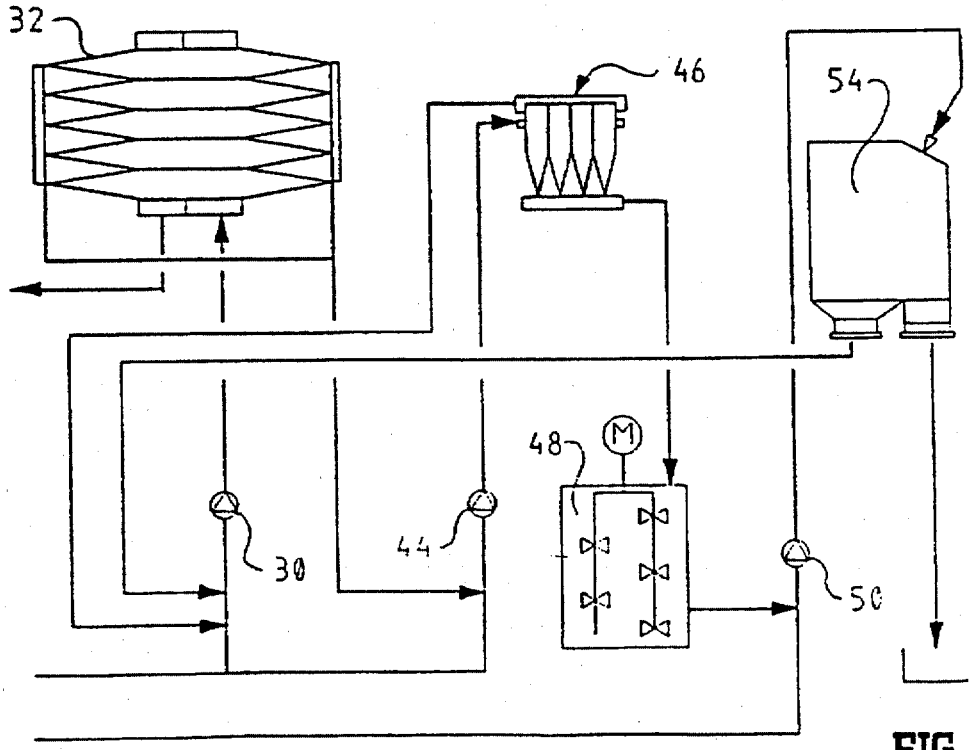
FIG. 3 schematically illustrates a filler treatment system in accordance with a second embodiment of the present invention.

FIGS. 2 and 3 disclose two process alternatives, which deviate from the phase subsequent to the dispersion stage of the mineral particles from each other. In both embodiments the material to be treated is obtained as coarse reject of the last step of the vortex cleaning plant 32. The rejected coarse fraction is led via a pump 44 to a cleaner 46, preferably a so called Eliminator-cleaner, i.e. to the first fractionation stage of the reject, in which the separated fine material is returned to the feed of the pump 30 to be fractionated again in the vortex cleaning plant 32 and the coarse fraction is led at a high consistency typical of the reject of the Eliminator-cleaner 46 to a mixing/dispersion apparatus 48, in which the rotor(s), propellers or like mix it generating differences in kinetic speed between the particles, i.e. shear forces, due to which the material is dispersed.

In the embodiment of FIG. 2 subsequent to the dispersion stage taking place in a mixing/dispersion apparatus 48 the mixture is diluted, pumped with a pump 50 to the cleaner 52, preferably a so called Eliminator-cleaner, to the last fractionation stage of the treatment process and the dispersed mineral fractions are fractionated with a vortex cleaner 52, from which the usable fractions are accepted so that they may be returned to the feed of the pump 30 to be reused in the vortex cleaning plant 32 and the coarse fraction is rejected either to be retreated or to be totally rejected.

In the arrangement of FIG. 3 the separation of the usable and coarse fraction subsequent to the dispersion and dilution is carried out by a screen-type apparatus 54, illustrated as a so called Micra-screen, in which the openings of the screen surface are chosen in such a way that the passed fraction is of its grain size such that it may be returned to the feed of the pump 30 and the coarse fraction on the screen surface is discharged from the process or led to further treatment.

The recycling and dispersion process of the dispersed mineral fractions may, of course, also be carried out in two or more stages. The coarse fraction, which is not dispersed in the first dispersion stage, may, of course, be treated again and thus the mineral loss exiting from the process may be diminished, see FIGS. 4–7.

Figure 4:
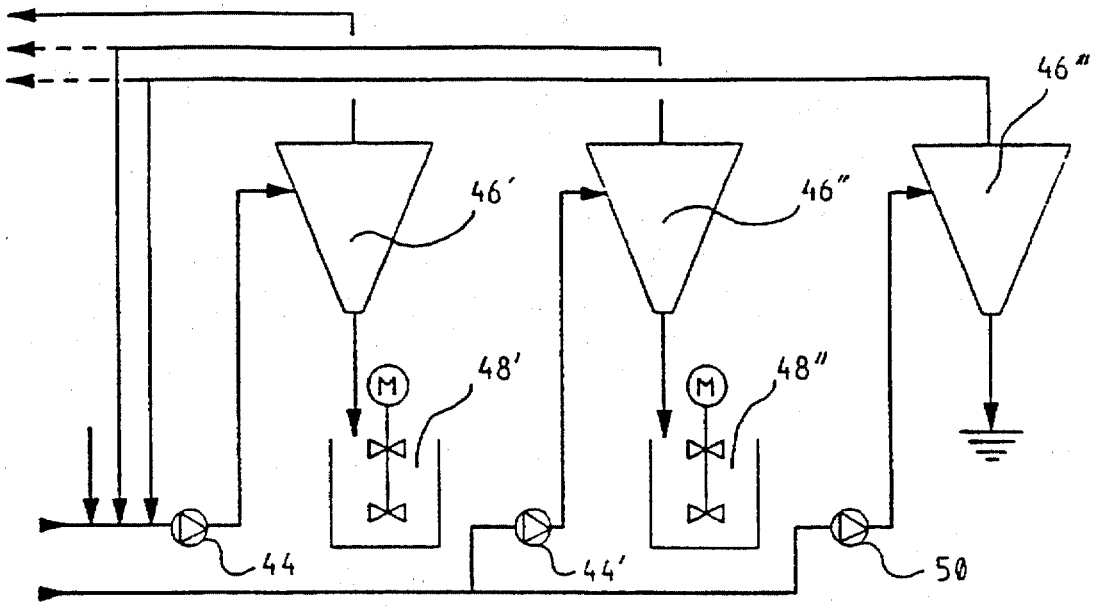
FIG. 4 schematically illustrates a filler treatment system in accordance with a third embodiment of the present invention.

FIG. 4 illustrates an alternative for the embodiments of FIGS. 2 and 3, more accurately to their later stages. In other words, the reject from a cleaner 46' is discharged at a high consistency to a mixing/dispersing apparatus 48', in which after the dispersion stage the material is diluted and fed by a pump 44' to the next cleaner 46". The reject from the cleaner 46" is led to the second mixing/dispersing apparatus 48" and after the dispersing stage and dilution by a pump 50 to a third cleaner 46'", from which the accept is fed as well as from the cleaner 46" to be reused or to one of the previous cleaning/fractionating stages (feed of the cleaner 46' shown as an example).

Figure 5:
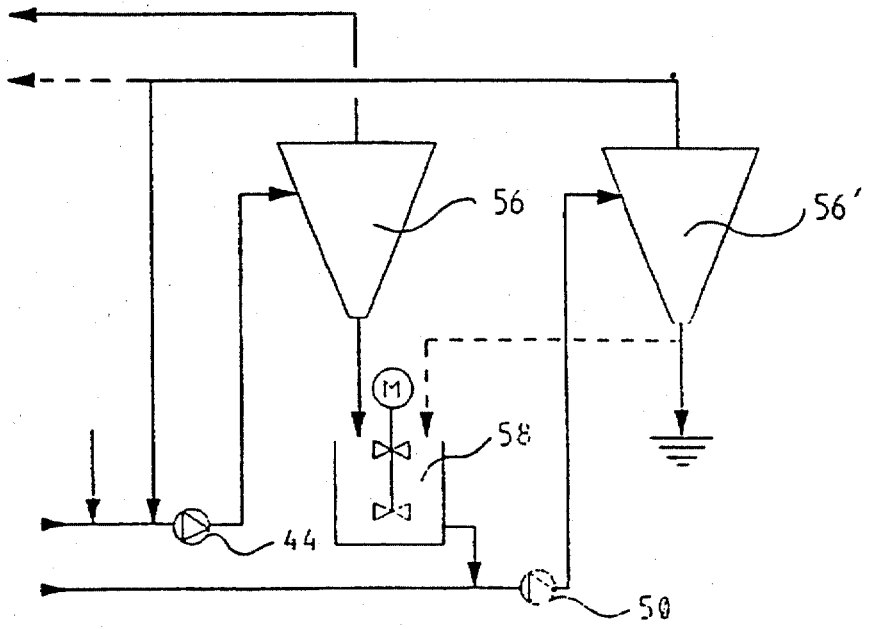
FIG. 5 schematically illustrates a filler treatment system in accordance with a fourth embodiment of the present invention.

FIG. 5 illustrates the connection of two cleaners 56 and 56' so that the reject of the latter cleaner 56' may not only be completely discharged from the system, but also part of it may be led back to a mixing/dispersing tank 58 to be dispersed again, whereby the material losses may be in principle totally avoided.

Figure 6:
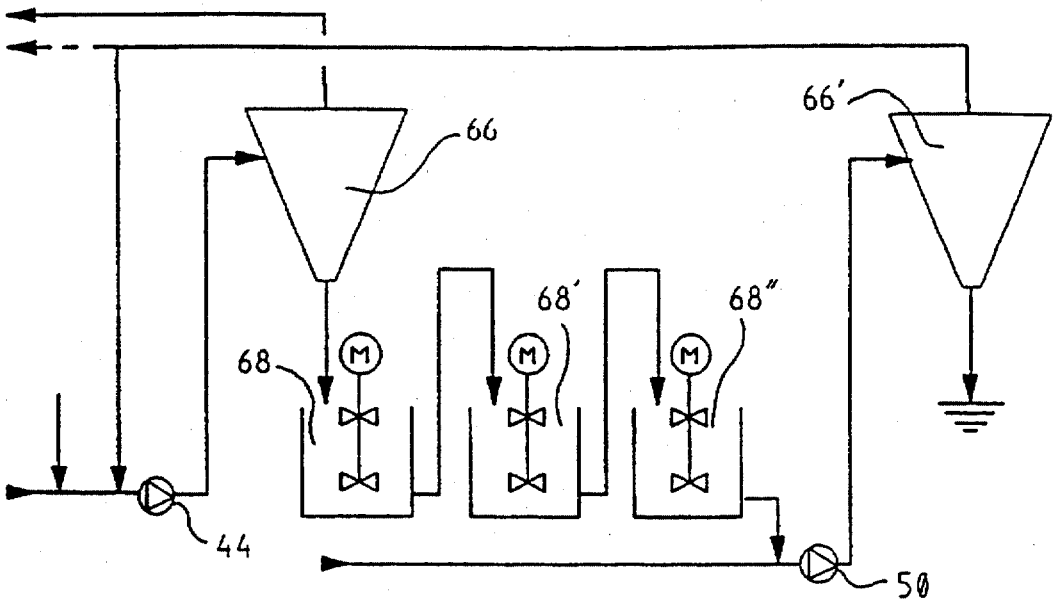
FIG. 6 schematically illustrates a filler treatment system in accordance with a fifth embodiment of the present invention.

FIG. 6 illustrates an embodiment, in which subsequent to a cleaner 66 several subsequent mixing/dispersing apparatuses 68, 68' and 68" are provided. Only after the described three-stage dispersion the material is led by the pump 50 to a cleaner 66', the accept of which is led to be reused or returned to the feed of the preceding cleaner 66 prior to the pump 44. The reject again is discharged either completely or it is further separately treated somewhere. However, it is completely possible that also the reject of the cleaner 66' is returned to one of the preceding refining stages for further refining. Moreover, it is possible that only two refining stages are provided, or more than three, completely depending on the need.

Also the refining treatment itself may be carried out either as one-stage or multistage process and at least in theory such a process might be possible, in which coarse fraction is recirculated for such a long time that also the possible sand, and like impurities are refined and returned to the process, whereby the system might be completely closed.

Figure 7:
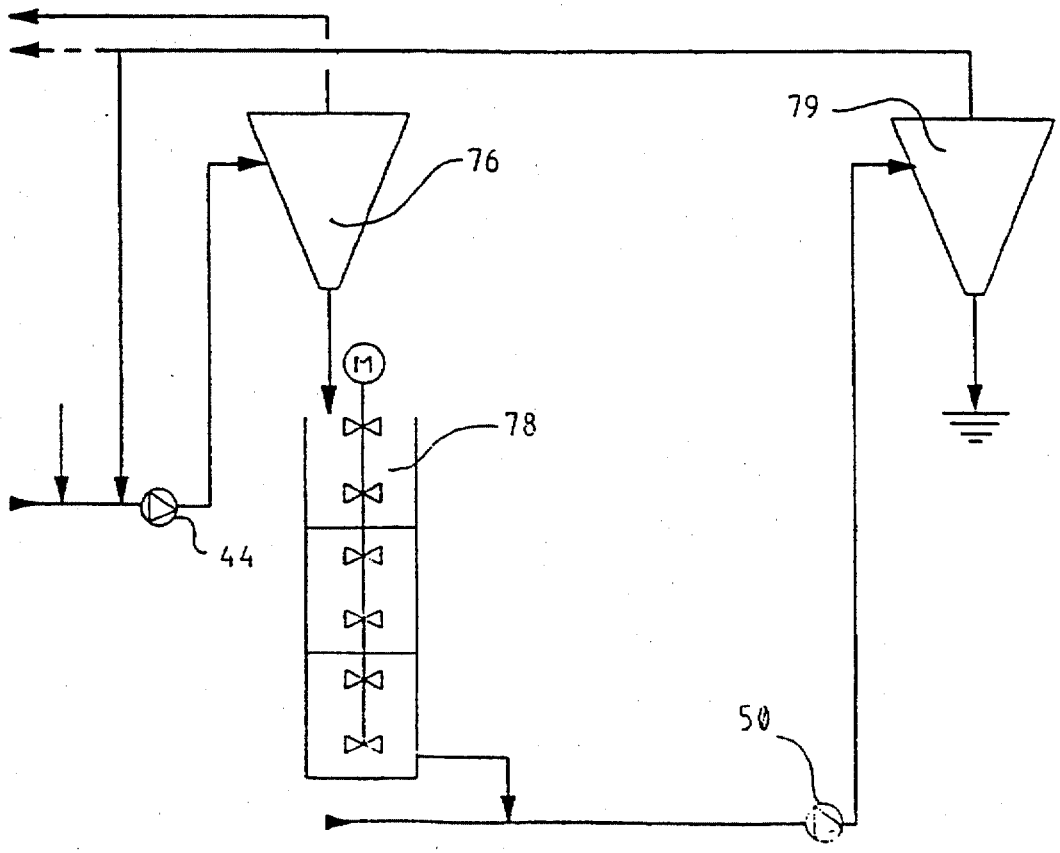
FIG. 7 schematically illustrates a filler treatment system in accordance with a sixth embodiment of the present invention.

FIG. 7 illustrates yet another embodiment, in which the reject of the cleaner 76 is led to a mixing/dispersing apparatus 78, which comprises several superposed mixing zones. The material dispersed in the apparatus 78 by the pump 50 is brought to the last fractionating stage in a cleaner 79. The object is to disperse material more efficiently than in a one-stage mixing tank.

Figure 8:
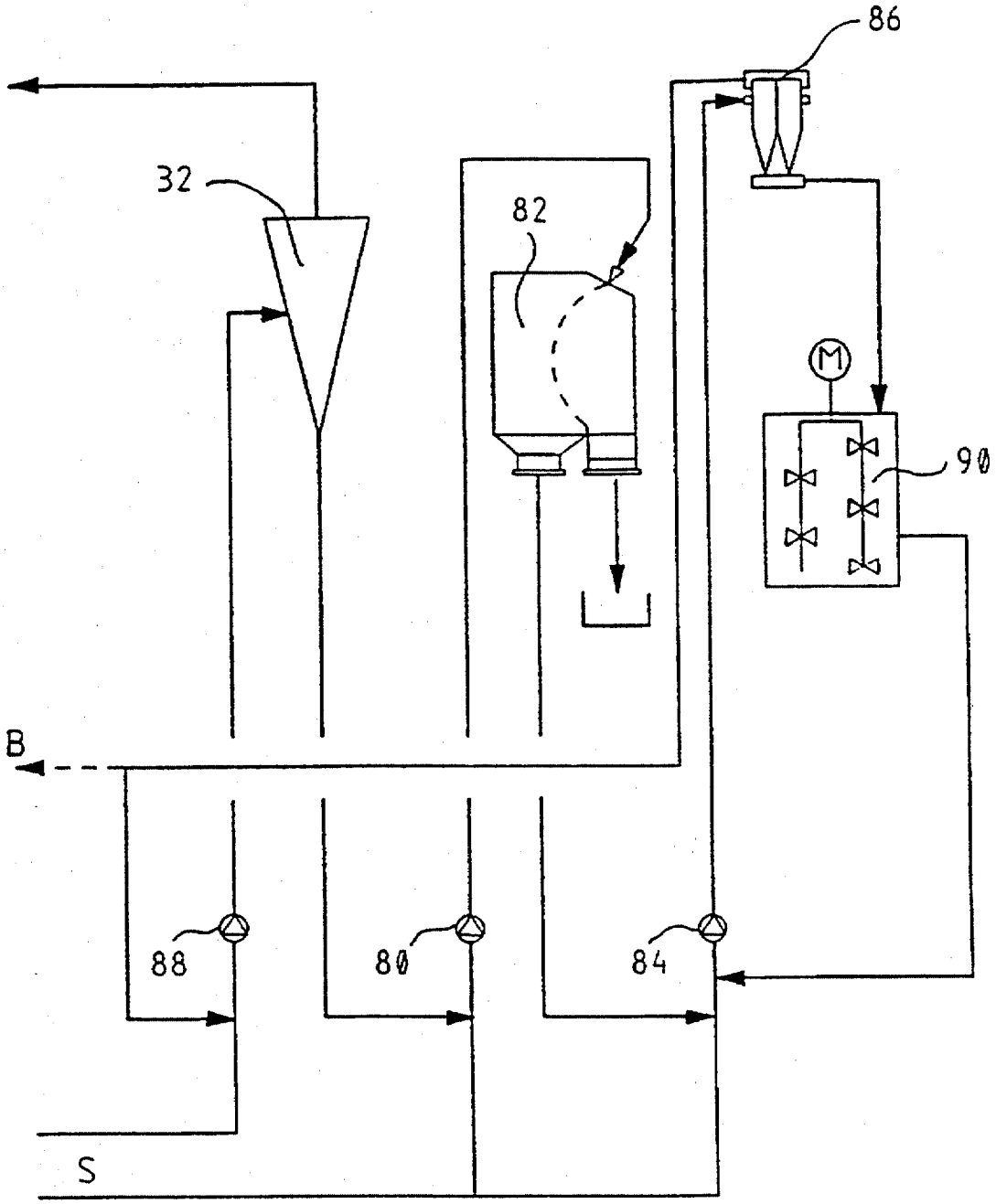
FIG. 8 schematically illustrates a filler treatment system in accordance with a seventh embodiment of the present invention.

FIG. 8 illustrates an alternative to the embodiments of FIGS. 2 and 3. In FIG. 8 the coarse reject of the last vortex cleaning step 32, the ash content of which may be even 60–80%, is led by a pump 80 and diluted with recirculation water preferably containing as little solids as possible, for example, with clear filtrate S from 0-fiber recovery, to the feed of a curved screen 82, a so called Micra-screen. A screen having a slot width of, for example, 100 μm is used as the screen surface of the curved screen 82. The inlet flow is divided by the curved screen 82 into thicker fraction and filtrate. All coarse fiber, shives and impurity fractions are discharged with the thicker fraction. The filtrate receives the filler particles which have passed through said 100 μm slots and most of the water. The filtrate of the curved screen 82, preferably diluted with recirculation water S containing as little solids as possible, is led by a pump 84 to the feed of the vortex cleaners 86. The accept of the vortex cleaners 86, which has most of the water and the fine filler fraction having the size of less than 10 μm, is returned, for example, to the feed of the last vortex cleaning step to the pump 88 or the reject thickening (broken line B). The reject of the vortex cleaning step 86 comprises filler fraction having the particle size of more than 10 μm at a high solids content of about 40–50%. Said reject is led, for example, with free drop, to a dispersion apparatus 90, in which the solid particles in the reject are subject to great shear forces. The filler particles are split and the flow exiting the dispersion apparatus 90 is mainly filler fraction having a usable, homogeneous size of less than 10 μm.

The filler fraction dispersed in the dispersion apparatus 90 is returned by the pump 84 to the feed of the vortex cleaning stage 86 operating in the above described manner. Thus the unrefined filler fraction may be recirculated in the dispersion apparatus 90 and vortex cleaners 86 until the filler particles are dispersed to a usable size.

Figure 9:
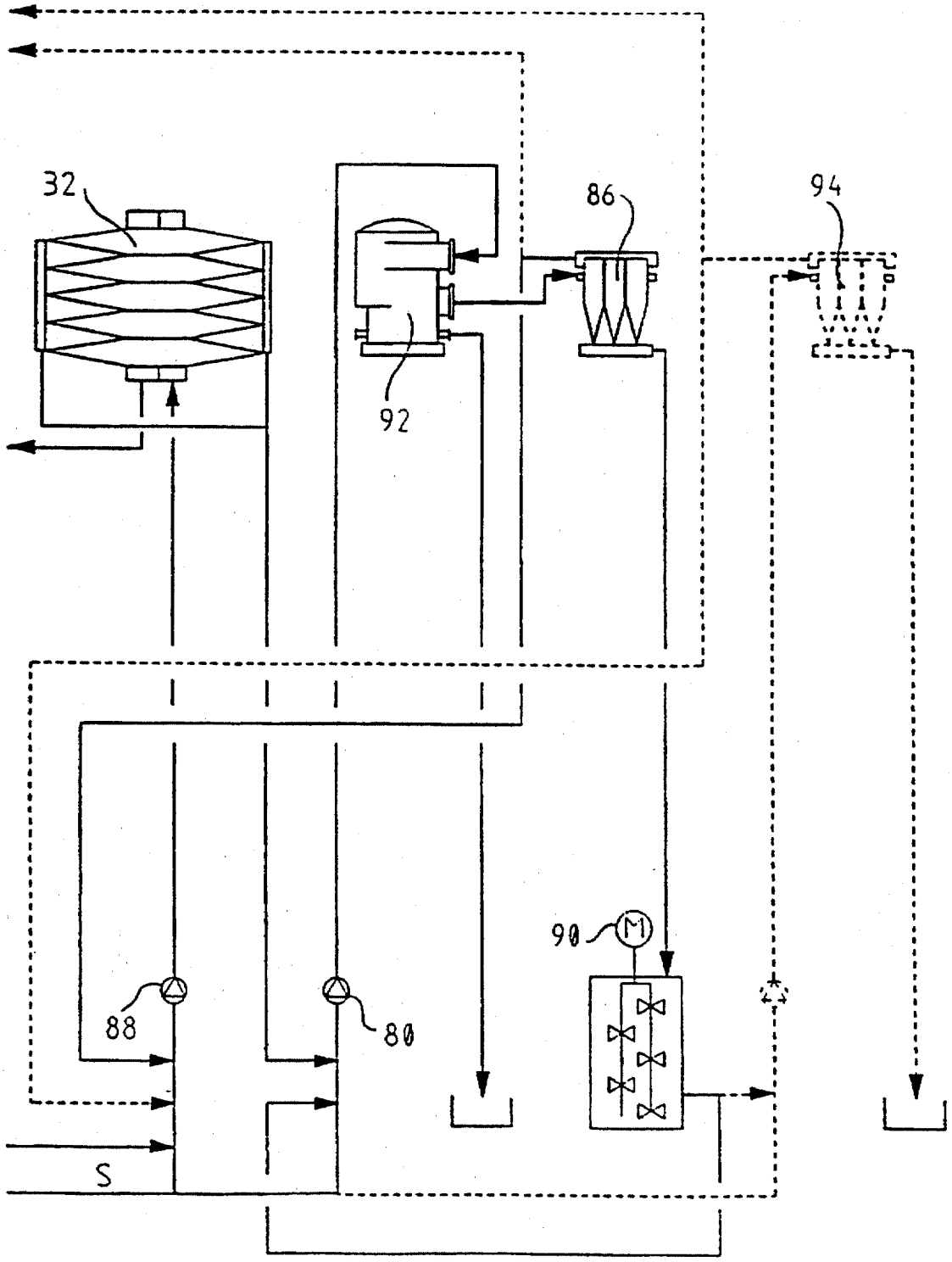
FIG. 9 schematically illustrates one version of the system illustrated in FIG. 8.

FIG. 9 illustrates an alternative corresponding to the embodiment of FIG. 8. The only significant difference to FIG. 8 is that a pressure screen 92 is used instead of a curved screen, which in the same way as the curved screen divides the reject coming from the vortex cleaning step 32 to a coarse fraction to be discharged from the process and to a fraction containing filler particles to be further treated, the treatment of which is already illustrated in connection with FIG. 8. It must, however, be noted that by using pressure screen 92 it may be possible to avoid the use of the pump 84 of FIG. 8, because the fine fraction obtained from the pressure screen may be fed directly to the vortex cleaners 86. Another difference in FIG. 9 compared with FIG. 8 is that the material refined in the dispersion apparatus 90 is returned to the feed of the pressure screen 92 and not directly back to the vortex cleaners as in FIG. 8.

Of course, it is possible also in the embodiments of FIGS. 8 and 9 to connect more screening stages and dispersion stages subsequently, for example, as in FIG. 4. Further, it is also possible to lead the dispersed material from the dispersion apparatus 90, for example, to a new screening stage 94 (the whole part of the process is illustrated with broken lines due to its alternative nature), from which the usable fine material is returned to use and the coarse fraction is rejected and discharged from the system.

Figure 10A:
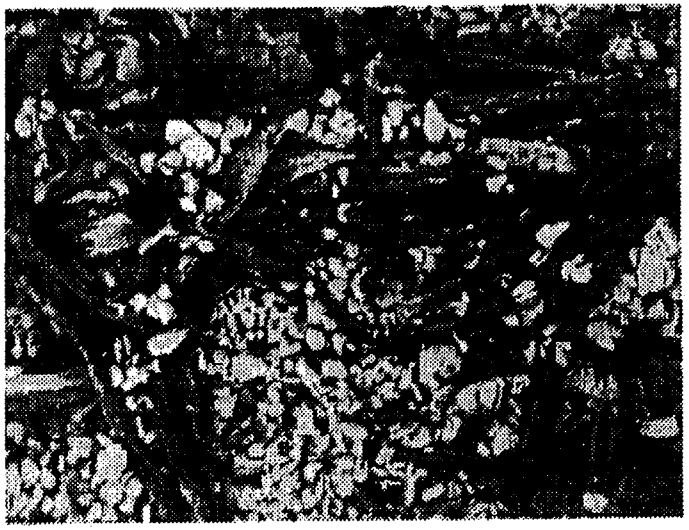
FIGS. 10a–c illustrate 100 times enlarged photographs of the material fed to the curved screen of the apparatus in accordance with FIG. 8 and both fractions obtained from the curved screen.
Figure 10B:
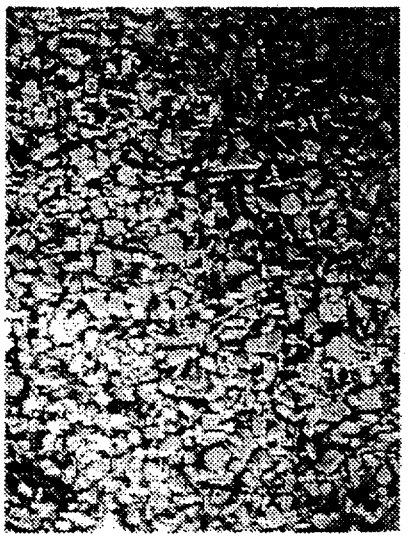
Figure 10C:
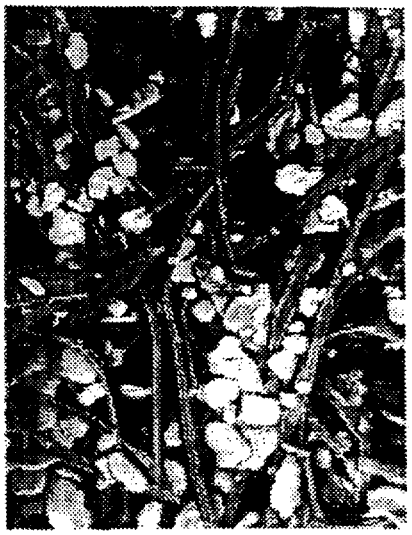

FIGS. 10a–10c illustrate the feed (FIG. 10a), the filtrate (FIG. 10b) and the reject (FIG. 10c) of the curved screen in the process. It becomes apparent in the drawings, how all the fibrous fraction and the large-sized filler particles from the feed in FIG. 10a have been rejected to FIG. 10c and the filtrate, FIG. 10b, contains merely filler fraction.

As may be seen from the above illustrated embodiments, which to some extent deviate from each other, new and previously unknown method and apparatus have been developed for treating recycled fibrous material so that as much of the filler therein as possible might be recovered and reused. Firstly, it must be noted that all the apparatuses illustrated in the drawings and in the description are connected to each other with flow channels suitable for the particular purpose, by a manner illustrated either in the drawings, or described in the description or claims. Further, it must be noted that the above described embodiments are only examples of many different variations of the invention and are by no means given to restrict the inventive concept, but are merely given as examples. Thus it is obvious that the mixing/dispersing apparatus in the above described embodiments is described as a tank, having at least one mixing/dispersing rotor, also grinders or mill-type comminuters known per se may be used. It is also obvious that the details described in connection with different embodiments are available to be used also in other embodiments without special notice. Thus the attached patent claims alone define the present invention.

I claim:

1. A method of treating filler-containing material utilizing a vortex cleaning plant having a plurality of steps including a last step, and utilizing a first fractionation stage and a last fractionation stage distinct from the vortex cleaning plant, said method comprising the steps of:

(a) passing filler-containing material to the vortex cleaning plant including the last step thereof in which the material is divided into a first, finer, fraction and a second, coarser, fraction;

(b) passing the second fraction to the first fractionation stage to divide the second fraction into a third, fine, fraction, and a fourth, coarse, fraction;

(c) returning the third fraction to the vortex cleaning plant;

(d) dispersing the fourth fraction to produce dispersed material;

(e) passing the dispersed material to the last fractionation stage;

(f) in the last fractionation stage, dividing the dispersed material into a fifth, fine fraction and a sixth fraction; and (g) returning the fifth fraction *to* the vortex cleaning plant, or to be treated again in steps (b) or (e).

2. A method as recited in claim 1 wherein steps (a) through (g) are practiced utilizing recycled fiber pulp as the filler-containing material.

3. A method as recited in claim 2 comprising the further steps, between steps (d) and (e), of: (h) dividing the recycled fiber material into a sixth fine fraction, and a seventh coarser fraction; (i) returning the sixth fraction to steps (a) or (b); and (j) dispersing the seventh fraction and using the dispersed seventh fraction in step (e).

4. A method as recited in claim 3 wherein step (i) is practiced by returning the sixth fraction to step (b).

5. A method as recited in claim 2 comprising the further step (h) of returning the sixth fraction to be dispersed in step (d).

6. A method as recited in claim 2 wherein step (d) is practiced by passing the fraction being dispersed into several consecutive dispersion stages without any fractionation stage therebetween.

7. A method as recited in claim 2 comprising the further step (h), between steps (d) and (e), of diluting the dispersed fraction.

8. A method as recited in claim 2 wherein steps (a) and (b) are practiced so that the fourth fraction has a consistency of greater than 30% prior to the practice of step (d), and step (d) is practiced at a consistency of greater than 30%.

9. A method of treating recycled fiber pulp containing filler comprising the steps of:

(a) passing the recycled pulp containing filler to a vortex cleaning plant having a plurality of steps including first and last steps;

(b) in the last step of the vortex cleaning plant dividing the pulp into a first finer fraction, and a second, coarser fraction;

(c) returning the first fraction to the vortex cleaning plant;

(d) screening the second fraction in a first screening stage to separate the recycled fiber pulp into a third fraction containing shives and other wood-based material, and a fourth fraction containing filler material;

(e) passing the fourth fraction to a second screening stage in which the fourth fraction is divided into a fifth, fine material, fraction and a sixth, coarse material, fraction; and (f) dispersing the sixth fraction in a dispersion stage.

10. A method as recited in claim 9 comprising the further step (g) of leading the dispersed sixth fraction from step (f) back to the second screening stage in step (e).

11. A method as recited in claim 9 comprising the further step (g) of leading the dispersed sixth fraction from step (f) back to the first screening stage in step (d).

12. A method as recited in claim 9 comprising the further step (g), after step (f), of fractionating the dispersed fraction from step (f) into a seventh fine fraction, and an eighth coarse fraction; (h) returning the seventh fraction to the vortex cleaning plant or to step (d); and (i) dispersing the eighth fraction.

13. A method as recited in claim 9 wherein steps (a) through (e) are practiced so as produce the sixth fraction at a consistency of greater than 30%, step (f) being practiced at a consistency of greater than 30%.

14. Apparatus for treating filler-containing material comprising:

a vortex cleaning plant including a first treatment stage and a last treatment stage, said last treatment stage comprising a fractionation stage producing a reject material including filler-containing material;

further treatment apparatus connected to said vortex cleaning plant for treating the reject material therefrom, said treatment apparatus comprising at least one dispersing device for breaking the filler-containing material into smaller particles; a pump and a first fractionation device between said at least one dispersing device and said vortex cleaning plant; and a pump and a second fractionation device on the opposite side of said at least one dispersing device from said first fractionation device; and means for returning filler material broken into smaller particles to said vortex cleaning plant.

15. Apparatus as recited in claim 14 wherein said further treatment apparatus further comprises a first fractionation device connected between said vortex cleaning plant and said at least one dispersing device.

16. Apparatus as recited in claim 15 wherein said further treatment apparatus comprises a second fractionating device disposed on the opposite side of said at least one mixing/dispersing device from said first fractionation device.

17. Apparatus as recited in claim 15 wherein said first fractionation device comprises a vortex separator.

18. Apparatus as recited in claim 14 wherein said at least one dispersing device comprises a first mixing/dispersing device, and further comprising a second dispersing device connected on the opposite side of said second fractionation device from said first dispersing device, and further comprising a pump and a third fractionation device connected on the opposite side of the second dispersing device from said second fractionation device.

19. Apparatus as recited in claim 14 wherein said second fractionation device contains a reject conduit, and wherein said reject conduit is connected to said dispersing device.

20. Apparatus as recited in claim 14 wherein said at least one dispersing device has at least two stages.

21. Apparatus as recited in claim 14 wherein said at least one dispersing device comprises a plate grinder, cone grinder, or mill grinder.

22. Apparatus as recited in claim 14 wherein said vortex cleaning plant is connected to the short circulation of a paper machine.

23. Apparatus for treating filler-containing material comprising:

a vortex cleaning plant including a first treatment stage and a last treatment stage, said last treatment stage comprising a fractionation stage producing a reject material; and further treatment apparatus connected to said vortex cleaning plant for treating the reject material therefrom, said treatment apparatus comprising at least one mixing/dispersing device, said further treatment apparatus comprising a first fractionation device connected between said vortex cleaning plant and said at least one mixing/dispersing device, and a second fractionating device disposed on the opposite side of said at least one mixing/dispersing device from said first fractionation device.

24. Apparatus as recited in claim 23 wherein said second fractionation device comprises a vortex separator.

25. Apparatus as recited in claim 23 wherein said second fractionation device comprises a curved screen or a pressure screen, having a perforated or slotted screen plate.

26. Apparatus for treating filler-containing material comprising:

a vortex cleaning plant including a first treatment stage and a last treatment stage, said last treatment stage comprising a fractionation stage producing a reject material including filler-containing material;

further treatment apparatus connected to said vortex cleaning plant for treating the reject material therefrom, said treatment apparatus comprising first and second dispersing devices for breaking the filler-containing material into smaller particles; a pump and a first fractionation device connected between said vortex cleaning plant and said first and second dispersing devices; and a pump and a second fractionation device connected on the opposite side of said first and second dispersing devices from said first fractionation apparatus; and means for returning filler material broken into smaller particles to said vortex cleaning plant.

*27. A method of treating filler-containing material in a production process utilizing a vortex cleaning plant, the vortex cleaning plant having a plurality of steps including a predetermined step, and utilizing a first fractionation stage, a mixing/dispersion stage, and a second fractionation stage operatively associated with the vortex cleaning plant, said method comprising the steps of*

*(a) passing filler-containing material to the vortex cleaning plant including the predetermined step thereof in which predetermined step the material is divided into a first, finer, fraction and a second, coarser filler rich fraction containing filler material;*

*(b) passing the second filler rich fraction to the first fractionation stage to divide the second fraction into a third, fine, fraction, and a fourth, coarse filler rich fraction;*

*(c) returning the third, fine, fraction to an earlier point in the production process;*

*(d) dispersing the fourth coarse filler rich fraction in the mixing/dispersion stage to produce dispersed filler rich material;*

*(e) passing the dispersed filler rich material from the mixing/dispersion stage to the second fractionation stage;*

*(f) in the second fractionation stage, dividing the dispersed filler rich material into a fifth, fine fraction and a sixth coarse fraction; and*

*(g) returning the fifth fine fraction to an earlier point in the production process.*

*28. A method as recited in claim 27 wherein (g) is practiced by returning the fifth fraction to be treated again in step (b).*

*29. A method as recited in claim 27 wherein steps (a) through (g) are practiced utilizing recycled fiber pulp as the filler-containing material.*

*30. A method as recited in claim 27 wherein steps (a) and (b) are practiced so that the fourth fraction has a consistency of greater than 30% prior to the practice of step (d), and step (d) is practiced at a consistency of greater than 30%.*

*31. A method of treating filler-containing material in a production process utilizing a vortex cleaning plant, the vortex cleaning plant having a plurality of steps including a predetermined step, and utilizing a mixing/dispersing stage and a fractionation stage which are operatively associated with the vortex cleaning plant, said method comprising the steps of:*

*(a) passing filler-containing material to the vortex cleaning plant including the predetermined step thereof in which predetermined step the material is divided into a first, finer, fraction and a second, coarser filler rich fraction;*

*(b) dispersing the second, coarser filler rich fraction in the mixing/dispersing stage to produce dispersed filler rich material;*

*(c) passing the dispersed filler rich material to the fractionation stage;*

*(d) in the fractionation stage, dividing the dispersed filler rich material into a third, fine fraction and a fourth coarser fraction; and*

*(e) returning the third fine fraction to an earlier point in the production process.*

*32. A method as recited in claim 31 wherein step (e) is practiced to return the third fraction to the vortex cleaning plant.*

*33. A method of treating filler-containing material utilizing a vortex cleaning plant, the vortex cleaning plant having a plurality of steps including a step producing a coarse output, and utilizing a mixing/dispersing stage and a fractionation stage operatively associated with the vortex cleaning plant, said method comprising the steps of:*

*(a) passing filler-containing material to the vortex cleaning plant including the step producing a course filler rich output such that the coarse filler rich output is divided into a first, finer, fraction and a second, coarser filler rich fraction;*

*(b) dispersing, in the mixing/dispersing stage the second coarser filler rich fraction to produce dispersed filler rich material;*

*(c) passing the dispersed filler rich material to the first fractionation stage;*

*(d) in the first fractionation stage, dividing the dispersed filler rich material into a third, fine fraction and a fourth coarser fraction; and*

*(e) returning the third, fine fraction to a point in the vortex cleaning plant upstream of the vortex step having the coarse output.*

*34. Apparatus for treating filler-containing material comprising:*

*a vortex cleaning plant containing the filler-containing material, said vortex cleaning plant having a plurality of stages and producing a reject filler-rich material, and further treatment apparatus operatively associated with said vortex cleaning plant for treating the reject material therefrom, said further treatment apparatus comprising:*

*at least one mixing/dispersing device for dispersing the reject filler-rich material;*

*a first fractionation device operatively associated with said vortex cleaning plant and upstream of said at least one mixing/dispersing device, wherein said first fractionation device is separate from said mixing/dispersing device, and*

*a second fractionating device disposed on an opposite side of said at least one mixing/dispersing device from said first fractionation device.*

*35. Apparatus as recited in claim 32 wherein said vortex cleaning plant is connected to a short circulation of a paper machine.*

*36. Apparatus as recited in claim 32 wherein said at least one dispersing device comprises a plate grinder, cone grinder, or mill grinder.*

* * * * *